Figure 1:
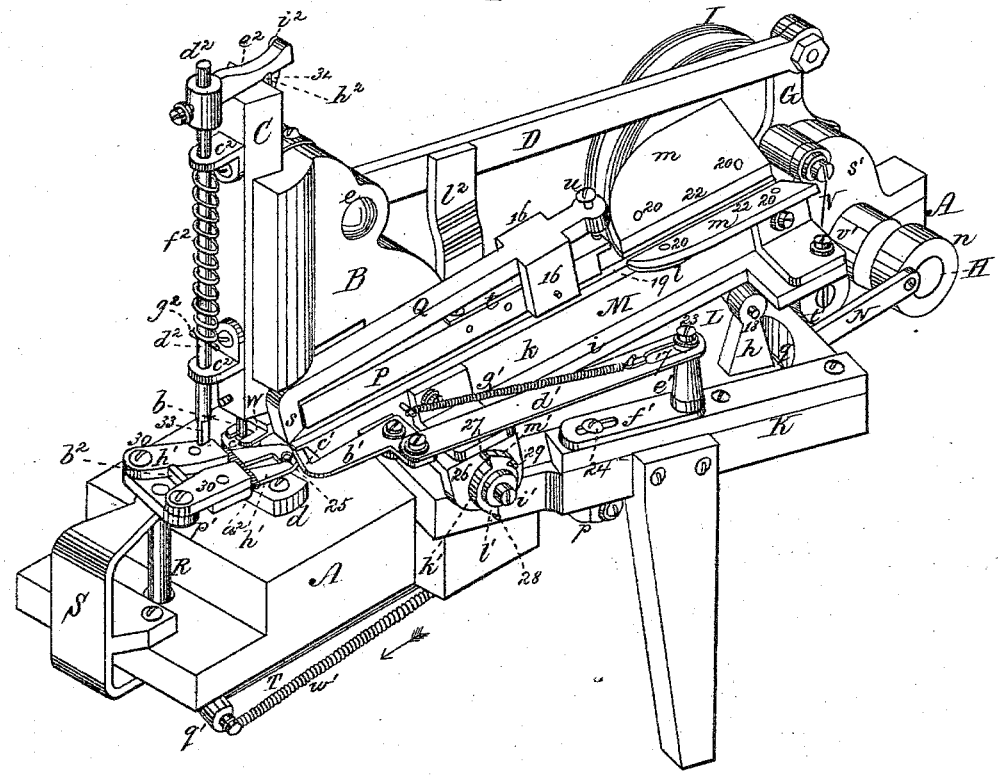

(No Model.)

4 Sheets—Sheet 1.

H. R. PACKARD.
MACHINE FOR TRIMMING AND SHAPING THE HEADS OF TACKS.

No. 289,023. Patented Nov. 27, 1883.

WITNESSES
W. J. Cambridge
Chas. E. Griffin

INVENTOR
Henry R. Packard
per H. E. Teschemacher
Atty

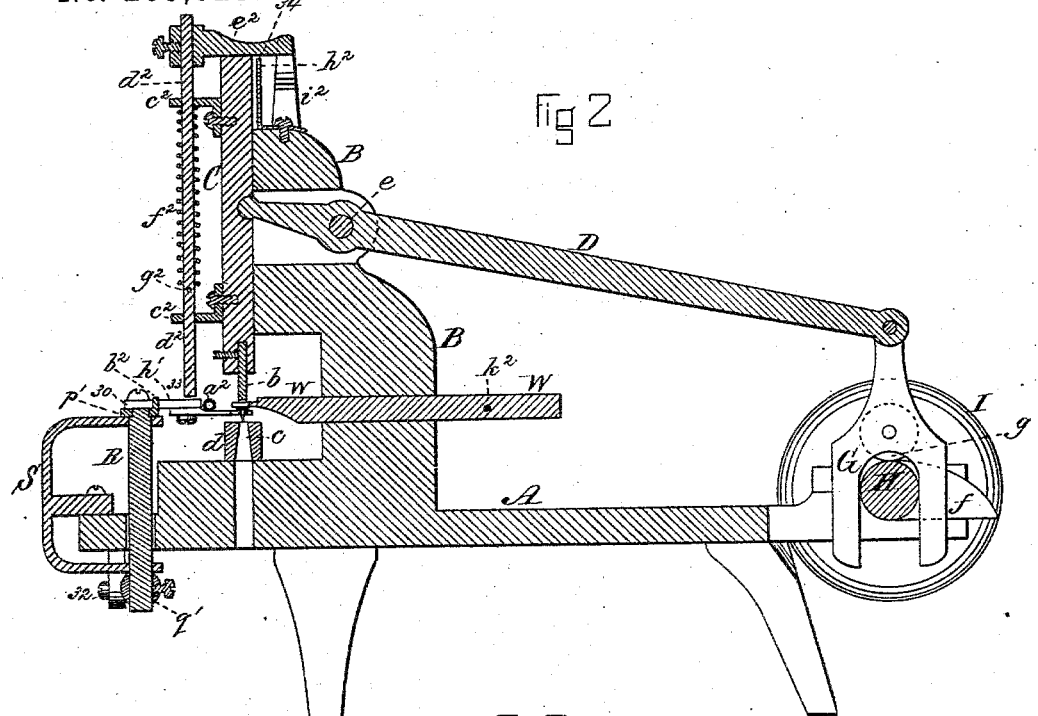
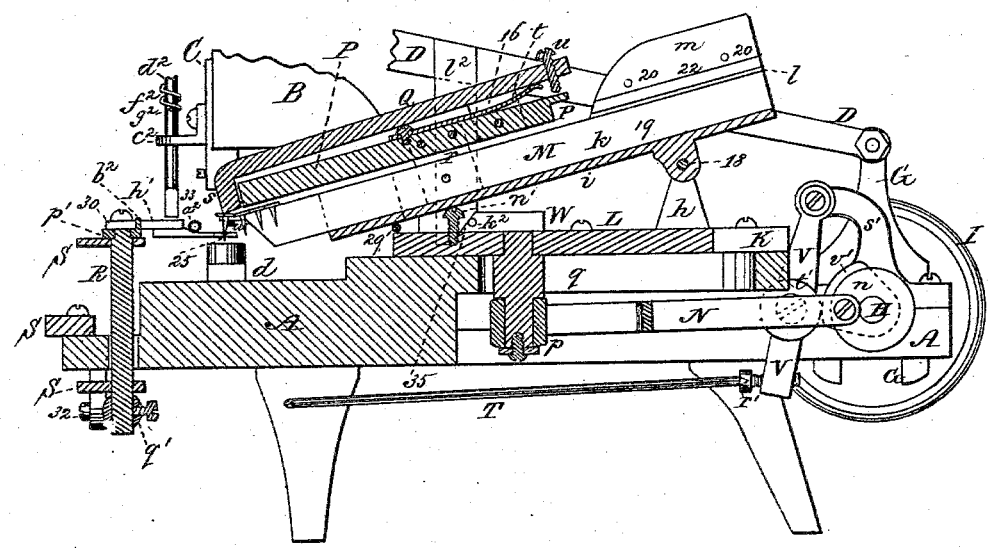

(No Model.)  4 Sheets—Sheet 3.
H. R. PACKARD.
MACHINE FOR TRIMMING AND SHAPING THE HEADS OF TACKS.
No. 289,023. Patented Nov. 27, 1883.
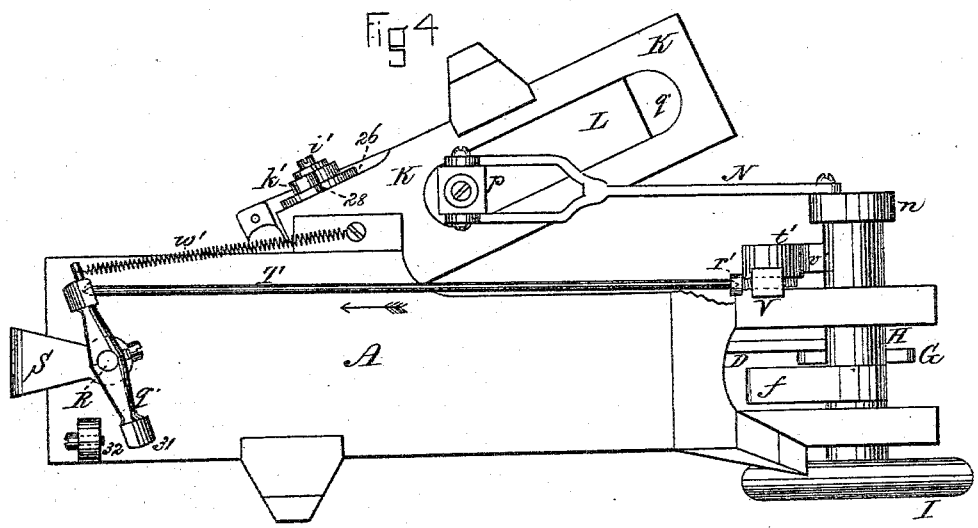
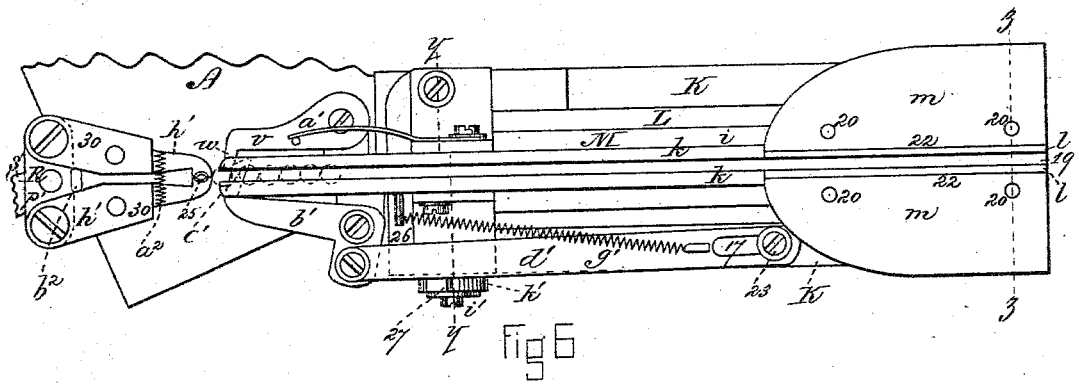
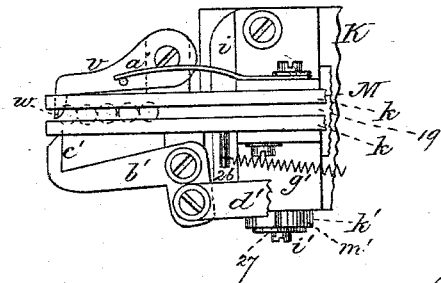
WITNESSES
W. A. Cambridge
Chas. E. Griffin
INVENTOR
Henry R. Packard
per J. E. Teschemacher
Atty

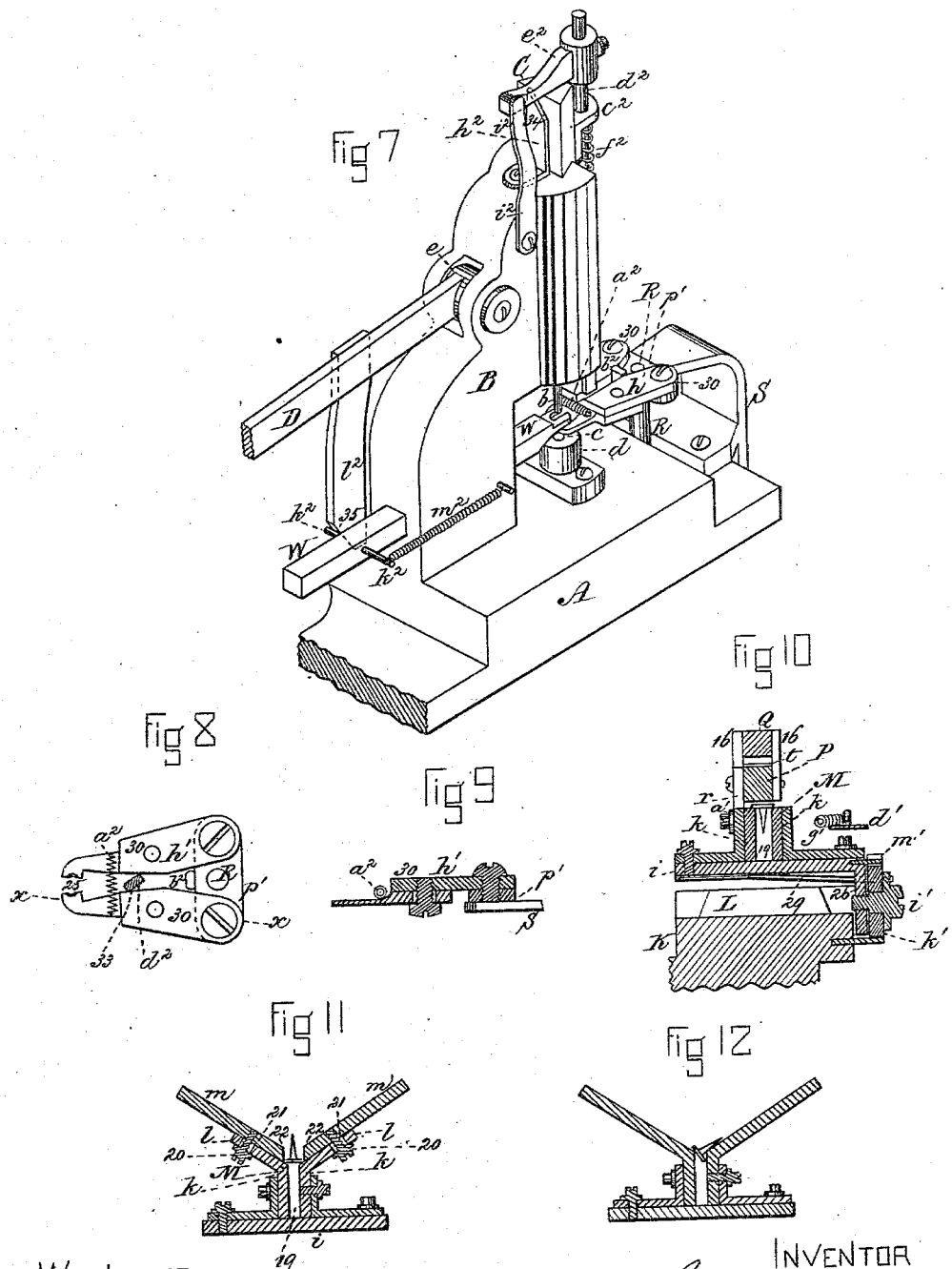

UNITED STATES PATENT OFFICE.

HENRY R. PACKARD, OF TAUNTON, MASSACHUSETTS, ASSIGNOR OF ONE-HALF TO THE ALBERT FIELD TACK COMPANY, OF SAME PLACE.

MACHINE FOR TRIMMING AND SHAPING THE HEADS OF TACKS.

SPECIFICATION forming part of Letters Patent No. 289,023, dated November 27, 1883.

Application filed September 16, 1882. (No model.)

*To all whom it may concern:*

Be it known that I, HENRY R. PACKARD, a citizen of the United States, residing at Taunton, in the county of Bristol and State of Massachusetts, have invented certain new and useful Improvements in Machines for Trimming and Shaping the Heads of Tacks, Nails, and Rivets, of which the following is a full, clear, and exact description, reference being had to the accompanying drawings, making part of this specification, in which—

Figure 1 is a perspective view of my improved machine for trimming and shaping the heads of tacks, nails, and rivets. Fig. 2 is a longitudinal vertical section through the center of the same. Fig. 3 is a longitudinal vertical section taken through the center of the chute and parts adjacent thereto. Fig. 4 is a plan of the under side of the machine. Fig. 5 is a plan (enlarged) of the chute and movable carrying-nippers and parts adjacent thereto, the cover of the chute being removed. Fig. 6 is a plan (enlarged) of the lower end of the chute and mechanism connected therewith. Fig. 7 is a perspective view of the front portion of the machine. Fig. 8 is a plan of the movable carrying-nippers open. Fig. 9 is a vertical section on the line $x\ x$ of Fig. 8. Fig. 10 is a vertical section on the line $y\ y$ of Fig. 5. Fig. 11 is a vertical section on the line $z\ z$ of Fig. 5. Fig. 12 is a vertical section through a chute, illustrating the construction in common use.

My invention relates to certain improvements in machines for trimming, shaping, and finishing the heads of tacks, nails, and rivets in order to give them any desired form; and it consists in certain automatic mechanism for receiving the tacks or nails and delivering them one at a time in a proper position to a pair of independent movable nippers, which carry them to the punching-dies, which finally give the heads the desired form, as hereinafter fully described.

In the said drawings, A represents the bed or frame-work of the machine, from which rises a vertical standard or frame, B, in a dovetailed way or groove, in the front of which slides a plunger, C, to the lower end of which is secured a die, $b$, of the shape and size to be given to the tack or nail head, the die $b$ being adapted to fit into a correspondingly-shaped female die, $c$, in a block, $d$, secured to the bed A. The plunger C is actuated by a lever, D, having its fulcrum at $e$, and to the rear end of the long arm of this lever is pivoted a bifurcated arm, G, which embraces the driving-shaft H, which latter runs in bearings secured to the bed A, and carries a balance-wheel, I, and a cam, $f$, which latter acts upon a friction-roll, $g$, secured to a stud projecting from the face of the arm G, which is thus raised by the cam to cause the plunger C to descend with the die $b$, the lever and arm descending by their own gravity, assisted by a spring, if desired, to raise the die $b$ as soon as the point of the cam passes from under the roll $g$.

Extending out from one side of the bed A, and forming an angle therewith, is a table, K, within suitable guides, on the upper surface of which fits a slide or carriage, L.

Between two standards, $h$, at one end of carriage L, is pivoted on a pin, 18, a lug projecting from the under side of an inclined chute or way, M. Said chute is composed of a plate, $i$, and two parallel bars or plates, $k\ k$, set edgewise at such distance apart as to leave a space, 19, between them for the reception of the shank of the tack or nail, the head of which rests upon the upper edges of the plates $k\ k$. The upper end of the chute M is provided with inclined or flaring side pieces, $l$, Fig. 11, to which are secured by screws 20, passing through slots 21, a pair of auxiliary inclined plates, $m$, which form a hopper or receiver for the tacks or nails to be dropped into. These plates $m$ have their lower edges, 22, beveled, so as to lie in vertical planes, and are set back from the edges of the space or opening 19 between the plates $k$ sufficiently to squarely and freely admit the head of a tack or nail, so that if the tack or nail drops head first into this space between the plates $k$, with its shank uppermost, as seen in Fig. 11, the shank will be enabled to turn over and be worked into its proper position, with its shank in the space 19, by the jar of the machine, and thus be prevented from turning sidewise and lying with its shank against either side of the receiver and its head cornerwise in the space or guideway, and sliding down in this position without being able to turn over, as illustrated in Fig. 12, as would be the case if the plates *m* were not employed, the shank of the tack or nail, if uppermost, being always held in a position in line with the space 19. By making the plates *m* adjustable upon the side pieces, *l*, by means of the screws 20 and slots 21, the distance apart of their lower edges, 22, may be varied to accommodate tack or nail heads of different diameters.

The slide L is reciprocated in its guideway, for a purpose to be hereinafter described, by a pitman, N, one end of which is pivoted to a crank-pin on the face of a disk, *n*, at one end of the driving-shaft H, the opposite end of the pitman, which is bifurcated, embracing and being pivoted to a block, *p*, which is pivoted upon the lower end of a stud projecting down from the under side of the slide L through a longitudinal slot, *q*, in the table K.

To a plate, *r*, on one side of the chute M is secured a bar, *p*, which forms a cover for the chute, and is arranged at such distance above it as not to interfere with the sliding of the heads of the tacks which rest on the upper edges of the plates *k*. To this bar P is pivoted by means of ears or lugs 16 a lever, Q, which extends longitudinally over the bar P, and is provided at its lower extremity with a hook-shaped projection, *s*, having an inclined lower face, the outer edge of which lies immediately over the nose or lower end of the chute, and is caused by means of a spring, *t*, to bear or press against the head of the outermost tack of the line and retain it in that position, for a purpose to be hereinafter described. The upward movement of the lever Q is limited by a screw, *u*, the lower end of which is adapted to strike the bar P when the lower end of the lever is raised.

To a lug on the inner side of the chute M is pivoted an arm, *v*, provided at its outer end with a hook or finger, *w*, which lies immediately under the nose of the chute, and when forced inward by a spring, *a'*, forms a stop for the front or foremost tack of the line in the chute to strike against. To a lug on the front side of the chute is pivoted a bell-crank lever, *b'*, having at its outer end a finger, *c'*, which lies immediately under the nose-piece of the chute, in the same plane as the finger *w*, the outer side of the point of this finger *c'* being beveled, as seen in Figs. 5 and 6. To the short arm of this lever *b'* is pivoted one end of a flat bar, *d'*, the opposite end of which is provided with a slot, 17, within which fits a screw, 23, projecting from the top of a vertical post, *e'*, rising from a piece, *f'*, secured to and made adjustable upon the table K by means of a screw, 24, passing through a slot, and thus as the slide L and chute M are moved forward the rear end of the slot 17 is brought into contact with the screw 23, and as the slide continues to move in the same direction the lever *b'* is moved on its fulcrum in such a manner as to withdraw the finger *c'* from under the end of the chute. When, however, the slide and chute are moved in the opposite direction, a spiral spring, *g'*, attached to the chute and the bar *d'*, holds the latter stationary for a short time and causes the finger *c'* to be thrown forward under the end of the chute, after which the chute and bar *d'* move backward together, which movement is permitted by the slot 17. As the tacks slide down the chute M, the foremost one is arrested by the finger *w*, and the slide and chute, being at the end of the forward stroke, now commence to move backward, which causes the finger *c'* to be moved inward, as previously explained, its point passing between the shanks of the two lower tacks, thus serving to hold back the whole line of tacks above the lowest tack, while the bevel of the outer side of the finger *c'* serves to press the outermost or lowest tack down to the very bottom of the chute, against the rounded end of the finger *w*, which yields against the resistance of its spring *a'*, to allow the tack to pass it, and in this position it is held by the projection *s* on the retaining-lever Q, with its point projecting down from the lower end or nose of the chute, as seen in Fig. 3. After the slide or carriage L has been drawn back to the end of its stroke, it is moved forward with the chute, for the purpose of depositing this lowest tack within a pair of movable carrying-nippers, *h'*, to be hereinafter described, which are adapted to receive the tack or nail from the chute and deliver it to the trimming or shaping dies *b c*, previously described. In order to properly deposit the tack within the aperture 25 at the end of the nippers *h'*, it becomes necessary to raise the lower end of the chute as it advances, to lift the point of the tack above the nippers and allow it to be deposited therein, when the chute again drops to its former position. This rise and fall of the chute is effected in the following manner:

To an angular projection, 26, on the front side of the chute is secured by means of a screw, *i'*, an oscillating disk, *k'*, provided on its under side with a ratchet-tooth, *l'*, Fig. 1, and on its upper side with a projection, *m'*, the straight side of which bears against a stop-pin, 27, on the projection 26, which holds the disk from revolving, and, as the chute advances, the inclined or rounded side of the tooth *l'* rides up on a pin, 28, projecting from the table K, and thus raises the chute on its pivot 18, as required, the chute dropping down to its original position as soon as the point of the tooth *l'* passes the pin 28. This dropping of the nose or lower end of the chute takes place at the termination of the forward movement of the carriage L, when the point of the tack is directly over the aperture 25 of the nippers, and serves to accurately place it therein. While the end of the chute is being raised, the finger *c'* is withdrawn, which releases the line of tacks, and at the same time allows the finger *w* to be forced inward by its spring *a'*, to catch and hold the foremost tack. As the carriage L and chute commence to move backward, the tack whose shank is in the aperture 25 of the nippers is drawn out from between chute and the projection s of the lever Q, and left in the nippers, to be carried to the dies, and the finger c' is at the same time forced inward, as before described, between the shanks of the two lower tacks, to hold back the line, and press outward the lowest tack to the extreme end of the chute, when the operation continues as before, a tack being deposited in the nippers at each forward and downward movement of the chute. As the chute is drawn back, the contact of the straight side of the teeth l' with the pin 28 causes the disk k' to be oscillated against the resistance of a light spring, 29, until this side of the tooth l' assumes such an angle as will allow it to ride up over and clear the pin 28, when the spring 29 will oscillate the disk in the contrary direction, until it is arrested by the contact of the projection m' with the stop-pin 27, when the tooth l' will be held in a proper position to again ride up over the pin 28 on the next forward movement of the chute, as before described.

n', Fig. 3, is a set-screw, which projects up vertically from the slide L, and forms an adjustable stop for the chute to rest upon and drop onto when released by the tooth l' dropping off the pin 28, and by means of this screw n' the distance of the lower end of the chute above the nippers may be adjusted with the greatest nicety.

In case the point of a tack or nail should not lie directly over the aperture 25 in the movable carrying-nippers when the end of the chute drops, but should strike the face of the nippers close to the aperture, the lever Q, resting on the head of the tack, would yield upward against the resistance of the spring t, until arrested by the contact of the set-screw u with the bar P, when the pressure of the projection s will tend to cause the point of the tack to slide down the inclined or countersunk sides of the aperture 25, as desired.

In case the end of the finger c' should strike squarely against the center of the shank of a tack or nail while being forced inward, or meet with any other obstruction on the withdrawal of the chute M, the slot 17 in the bar d' will allow the latter to move over the screw 23, thus avoiding breakage or injury of the mechanism, as would occur if the end of the bar d' were secured immovably to the post e'.

I will now describe the construction of the movable carrying-nippers h' and their mode of operation. The jaws of these nippers are of the form shown, each having formed in its outer end one-half of the aperture 25, which receives the shank of the tack, and being so cross-bar or lever, q', which is secured at or near the center of its length to this shaft. In a conical recess at one end of the lever q' fits the pointed end of a long rod or push-bar, T, the opposite end of which is also pointed, and rests in a conical recess in the head of a screw, r', made adjustable in the lower end of a lever, V, pivoted to a curved standard or bracket, s', on the bed A, and carrying a friction-roll, t', which bears against the face of a cam, v', on the driving-shaft H, and thus, as the shaft rotates, the cam v' at the proper time moves the lever V and pushes the rod T in the direction of the arrow, Figs. 1 and 4, which moves the lever q' against the resistance of a spiral spring, w', one end of which is secured to the lever and the other end to the bed A, the return movement of the levers q' V and rod T in a direction contrary to the arrow being effected by the spring w' when permitted by the cam v'. These movements of the lever q' are communicated to the rock-shaft R, which thus causes the nippers h' to be swung over to one side, to receive the tack or nail from the chute M, as before described, and then back again, to deliver the said tack or nail to the trimming and shaping dies b c, the jaws of the nippers being kept closed during this movement by a light spring, $a^2$, and being maintained in their proper central position by a stop-pin, $b^2$, projecting up from the cross-bar p', against which the stocks 30 of the nippers strike when thrown toward each other by the spring $a^2$. When the lever q' is retracted by the spring w', its end 31 is brought into contact with a set-screw or stop, 32, projecting from a lug on the under side of the bed A, which can thus be adjusted to arrest the nippers, with their aperture 25 directly over the center of the lower die, c, as required, to allow the point of the tack to enter the cavity of the said die, and by adjusting the screw r' at the lower end of the lever V the movement of the nippers in the opposite direction can be regulated with great nicety to cause them to stop when the aperture 25 is exactly in line with the space or way 19 of the chute M. The above-described movable carrying-nippers h' are thus made entirely separate from the chute M, and are operated independently thereof by different mechanism, the movements of the nippers and chute being accurately timed with respect to each other and the trimming and shaping dies to produce the desired result.

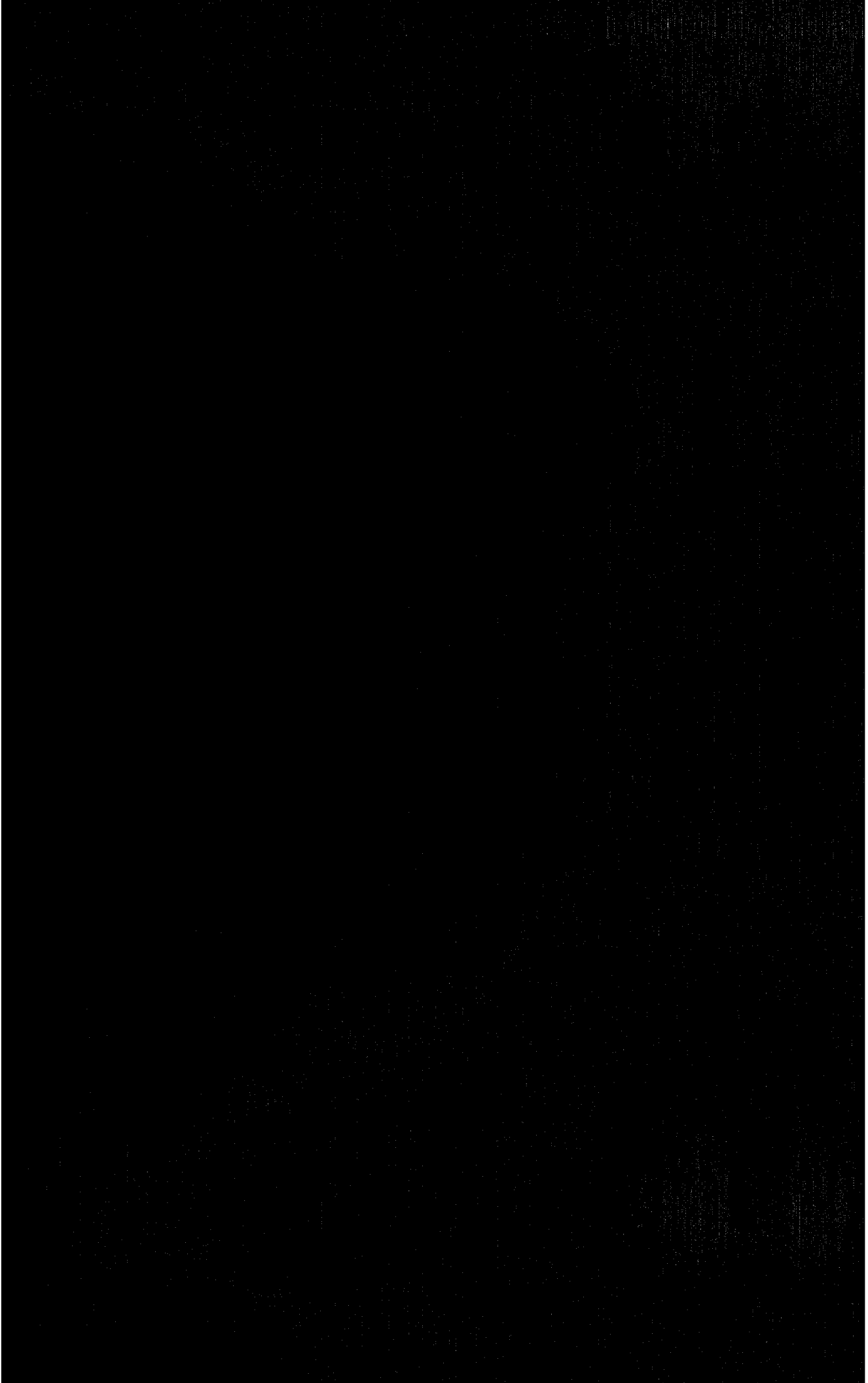

I will now describe the manner in which the nippers h' are opened to release the tack or nail therein and allow it to drop into the lower die, c. In bearings $c^2$, attached to the front